Patented Sept. 11, 1945

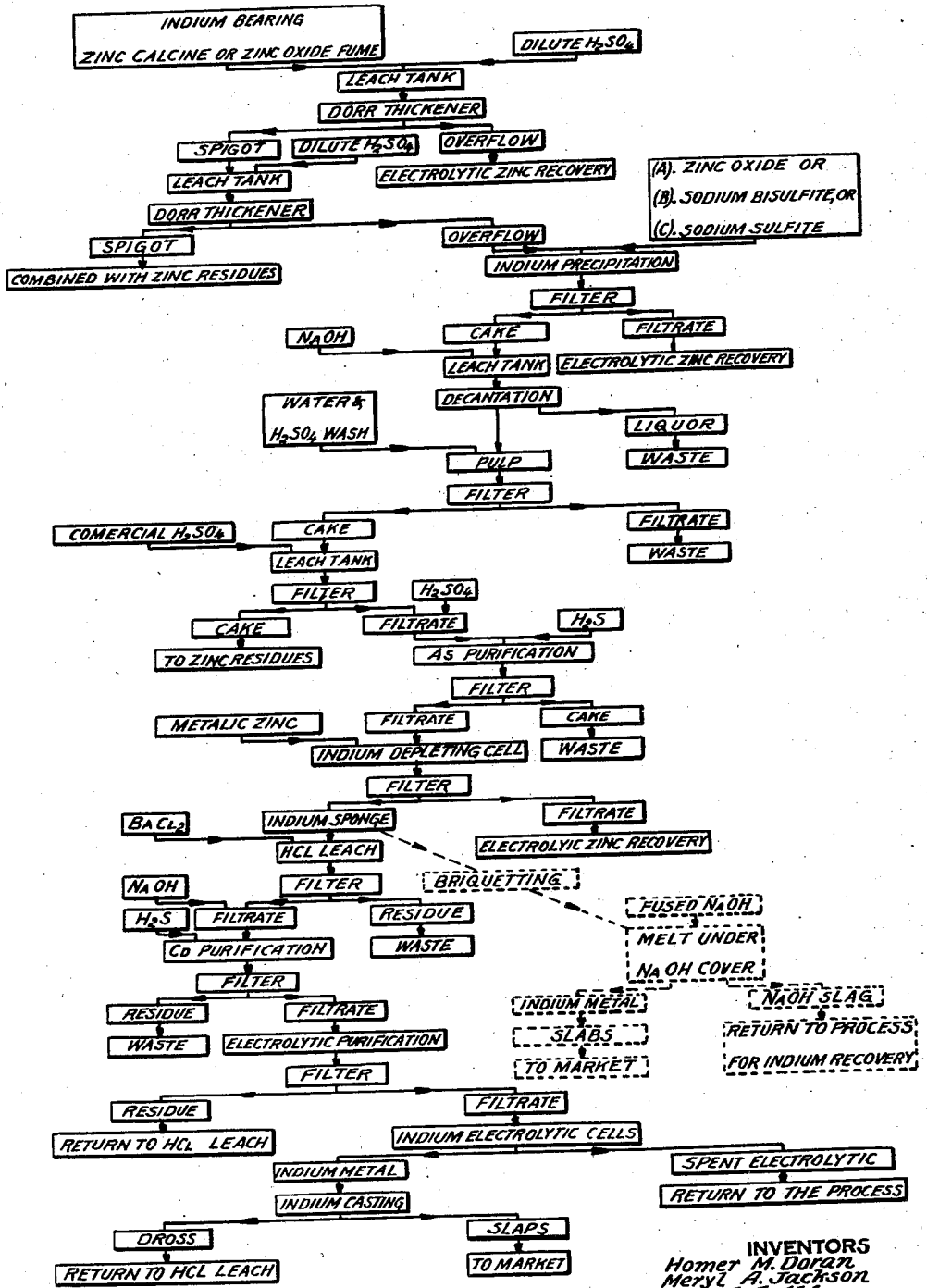

2,384,610

UNITED STATES PATENT OFFICE 2,384,610

RECOVERY OF INDIUM

Homer M. Doran, Meryl A. Jackson, and Alfred I. Alf, Great Falls, Mont., assignors to Anaconda Copper Mining Company, New York, N. Y., a corporation of Montana Application May 8, 1940, Serial No. 333,920

7 Claims. (Cl. 75—121)

This invention relates to the recovery of indium, and has for its principal object the provision of an improved method for recovering indium. The method of the invention involves a novel combination of steps, many of which are themselves novel procedures for the treatment of indium-bearing materials.

Indium, in nature, is generally found associated with zinc ores, such, for example, as complex lead-zinc ores. In the customary practice of concentrating such lead-zinc ores, the indium is found largely in the zinc concentrates. Some indium follows the lead concentrates, however, and indium is therefore found in the lead blast furnace products such as flue dust and lead blast furnace slag. In the treatment of the lead blast furnace slag for the recovery of zinc oxide, indium is found concentrated in the zinc oxide fume.

In the hydrometallurgical treatment of zinc ores and other zinc materials for the electrolytic recovery of zinc, the ore is first concentrated. The zinc concentrates are roasted or calcined to change the sulphides into soluble oxides, and the calcined material is leached with sulphuric acid to dissolve the zinc and other soluble oxides. The resulting zinc-bearing sulphate solution is purified to remove those metals injurious to the electrolytic deposition of zinc and zinc is recovered from the purified solution by electrolytic deposition of the metal on aluminum cathodes.

It is the general practice, although not always followed, to leach the calcined material in two stages. In the first leach or stage an excess of calcine is added as a purifying agent. The excess of zinc oxide is then dissolved in a second leach or stage, and the solution from this stage is added to the acid used in the first stage. Thus, all of the solution is subjected to the purifying effect of the zinc oxide.

In cases where the calcined material contains only very small amounts of such impurities as arsenic, antimony, germanium, iron, etc., the purification treatment with zinc oxide calcine may be eliminated and complete extraction of the zinc may be accomplished in one leach, which should be finished slightly acid.

When zinc oxide fumes are treated for the electrolytic recovery of zinc, either of the above methods may be used, depending on the amount of impurities in the fumes. In some cases, where the amount of impurities contained in the fumes is substantially larger than the amount generally contained in ordinary zinc calcines, it is advisable to employ only the acid leach. The impurities in the acid leach solution are then removed by any suitable method before the electrolytic removal of the zinc from the solution.

Indium and the oxides of indium are soluble in sulphuric acid, forming indium sulphate. Therefore, in any of the above methods for treating zinc-bearing material, any indium present in the original material will be found in the acid leach solution. Heretofore known methods for the recovery of indium metal are concerned principally with the treatment of this indium-bearing acid leach solution.

The usual method employed for the recovery of indium from acid sulphate solutions comprises first precipitating the indium from solution as indium hydroxide. This is accomplished by neutralizing the acid solution with a base such as zinc oxide. The indium hydroxide precipitate is filtered away from the solution and dissolved in sulphuric acid. This dissolution, filtration and precipitation may be repeated a number of times until a sufficient concentration of indium is obtained. The indium hydroxide precipitate is then finally dissolved in sulphuric acid, the undissolved portion of the material filtered away from the solution, and the indium-bearing acid sulphate solution treated with hydrogen sulphide gas. By suitable adjustment of the acidity of the solution, any arsenic present in the solution is removed as arsenic sulphide. By a second adjustment of the acidity of the solution, the indium is precipitated as indium sulphide. The indium sulphide precipitate is leached with concentrated hydrochloric acid, and the acid chloride solution, after suitable purification, forms the electrolyte from which indium metal is recovered electrolytically.

The present invention provides an improved method for the recovery of indium from indium-bearing material such as zinc calcines or fumes which avoids the necessity of treating large volumes of leach solution to recover indium present therein in very low concentrations. The method of the invention is described below with particular reference to the treatment of indium-bearing zinc calcine or zinc oxide fume containing impurities including iron and arsenic, but it is understood that the process can be applied equally well to the treatment of any other indium-bearing material in which the indium present is soluble in sulphuric acid.

A complete process for the recovery of indium in accordance with the method of the invention from an indium-bearing material containing zinc in acid-soluble form and further containing impurities including iron and arsenic involves first leaching the material with a very dilute acid solution in such manner that the bulk of the zinc is dissolved and the indium remains in the undissolved residue. In this manner the bulk of the zinc is separated from the indium in the initial leaching operation, and further treatment of the indium-bearing material is very much facilitated by the reduction of the volume of the material to be treated.

The indium-bearing residue from the initial very dilute acid leach is then dissolved in a relatively strong acid, advantageously sulphuric acid, to obtain an acid solution containing indium. This solution is treated with a reagent of the group consisting of zinc oxide, sodium bisulphite, and sodium sulphite in such manner as to form an insoluble precipitate containing indium free from the bulk of the iron and arsenic originally present. In this manner the indium-bearing material is freed, at an early stage in the process and without substantial loss of indium, from the greater part of the mineral impurities with which it is associated in the original material. In consequence the recovery of metallic indium of high purity is greatly facilitated.

The indium-bearing precipitate thus obtained may be treated with an aqueous solution of a strong alkali to dissolve aluminum and a further amount of arsenic. After this treatment, the precipitate may be washed with water and decanted. The precipitate may then be treated with dilute sulphuric acid in such manner as to dissolve at least a portion of the remaining zinc without acidifying the precipitate. It is important that the precipitate be not acidified, or the indium will dissolve and the benefit of the alkali treatment and the dilute sulphuric acid wash will, to a large extent, be lost.

After completion of the dilute sulphuric acid treatment or wash, the indium-bearing precipitate is dissolved in a relatively strong acid solution, and this strongly acid indium-bearing solution is treated with a sulphide such as hydrogen sulphide gas so as to precipitate substantially all of the remaining arsenic. The precipitated sulphides are separated from the residual solution and the resulting arsenic-free solution is treated with metallic zinc, whereby metallic sponge indium is precipitated. It is important that all of the arsenic be eliminated from the solution prior to treatment with metallic zinc so as to avoid danger of the formation of extremely poisonous arsine gas.

The sponge indium obtained by treatment of the solution with metallic zinc is then treated for the recovery of metallic indium in commercial form. Although this may be accomplished in a number of ways, the present invention contemplates two novel procedures for this purpose, either of which may be employed depending upon the desired purity of the indium metal recovered. If metallic indium of ordinary commercial purity is satisfactory, the indium sponge obtained from the treatment with metallic zinc may be melted in a suitable vessel beneath a cover of a fused strong alkali. The fused alkali cover prevents oxidation of the molten indium and further effects some additional purification of the metal during melting. The molten indium is cast from the melting vessel into suitable shapes for the market.

If, on the other hand, it is desired to produce metallic indium of very high purity, the sponge precipitated by the metallic zinc is dissolved in hydrochloric acid. The resulting solution of indium in the form of a chloride is then treated, advantageously with barium chloride, to precipitate sulphate ions, which if present in any appreciable amount would interfere with subsequent recovery of pure indium by electrolytic means. The sulphate-free solution may be treated with a sulphide under suitable conditions as to acidity so as to effect precipitation of a further quantity of impurities, such as cadmium, and the precipitate thus formed may be separated from the residual solution.

To eliminate last traces of impurities from the solution, the indium-bearing solution is introduced into an electrolytic cell fitted with a cathode and a soluble anode, advantageously an anode of indium metal. The solution in the cell is subjected to the action of an electric current of such current density and at such applied voltage as to overcome polarization and effect deposition of impurities at the cathode without substantially depleting the solution of indium and without causing deposited impurities to be redissolved.

After substantially complete purification of the solution in this manner, the solution is withdrawn from the electrolytic cell and separated from any slimes that may have formed. The purified solution is introduced itno a second electrolytic cell fitted with an anode and a cathode, each advantageously composed of graphite, and is there subjected to the action of an electric current at sufficiently high current density and applied voltage to overcome polarization and to effect deposition of metallic indium of high purity at the cathode. The indium metal so deposited is stripped from the cathode, melted, and cast into suitable shapes for the market.

The invention will be better understood from the following detailed description of the complete process, considered in conjunction with the accompanying flowsheet.

The first step in the new process for the recovery of indium from indium-bearing calcines, zinc oxide fumes or other indium-bearing material is to treat the material with dilute sulphuric acid in such a way as to dissolve practically all of the zinc and other soluble oxides, and to leave all of the indium undissolved in the leach residue. This is accomplished by maintaining the acidity of the leach solution at from 1 to 3 g./l. $H_2SO_4$. At this acidity, indium is either insoluble in sulphuric acid, or it is precipitated from solution by the action of the zinc oxide after first being dissolved. This method of leaching the indium-bearing material is particularly advantageous if arsenic and iron are present, inasmuch as considerable amounts of these two metals will remain in the leach solution so long as its acidity is maintained at or near the value given, and so will be separated from the indium. If the solution were allowed to become neutral or basic, most of the arsenic and iron would be precipitated and accompany the indium. The acid zinc sulphate solution from this leach is separated from the unleached material by settlement and filtration according to the usual practice, and is treated in the usual manner for the electrolytic recovery of its zinc content.

The indium-bearing residue from this leach, which also contains insoluble substances such as lead compounds, is treated with relatively strong sulphuric acid to dissolve the indium and whatever other soluble substances are present. This is accomplished by adding sulphuric acid to the residue until the acidity of the solution reaches 20 to 25 g./l. $H_2SO_4$. At this acidity, the maximum amount of indium has been dissolved. If the acidity of the leach is brought up gradually to from 20 to 25 g./l. H₂SO₄, part of the arsenic and iron which is in the residue will not be dissolved but will remain in the undissolved portion of the residue. This latter method of leaching is particularly advantageous when the original indium-bearing material contains arsenic and iron. When this leach is completed, the acid sulphate solution is separated from the undissolved residue by settlement or filtration or both.

The acid sulphate solution from the above-described leach contains all of the recoverable indium present in the original indium-bearing material. The first step in the recovery of this indium may be in accordance with any one of the three following procedures.

*Procedure A.*—Zinc oxide is added to the indium-bearing acid sulphate solution until the acidity of the solution has been reduced to from 1 to 2 g./l. H₂SO₄. At this acidity, substantially all of the indium is precipitated as indium hydroxide, a minimum of zinc is assured in the precipitate, and part of the arsenic and iron still present remains in the solution and so may be separated from the indium. The indium hydroxide precipitate is separated from the bulk of the solution by settlement and decantation, after which the residual solution is separated from the precipitate by filtration. It is desirable to heat the solution before filtration to facilitate the filtering operation. The indium precipitate is now ready for further treatment.

*Procedure B.*—The indium-bearing acid sulphate solution is treated with a base, such as zinc oxide, until the acidity is reduced to from 1 to 5 g./l. H₂SO₄, whereupon sodium bisulphite is added in quantity sufficient to precipitate the indium as basic indium sulphite

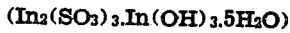

$(In_2(SO_3)_3.In(OH)_3.5H_2O)$

The addition of the sodium bisulphite to the acid solution causes the generation of sulphur dioxide gas, and this gas will reduce all of the iron and a large portion of the arsenic. When arsenic and iron are in a reduced state, they will not be precipitated with the indium, especially when the solution remains slightly acid, as is true in this case. After the addition of sodium bisulphite, the solution is heated to from 70 to 85° C., and the basic indium sulphite precipitate is separated from the solution by filtration. The basic indium sulphite precipitate is now ready for further treatment.

*Procedure C.*—The indium-bearing acid sulphate solution is treated with sodium sulphite in sufficient quantity to reduce the acidity of the solution to from 1 to 3 g./l. H₂SO₄. When this acidity has been reached, the solution is treated with a base such as zinc oxide until the solution has become neutral, but not basic. It may be desirable to have about 1 g./l. H₂SO₄ remain in solution. The action of the sodium sulphite is similar to that of sodium bisulphite. Sodium sulphite, however, is more basic in its reaction than the bisulphite, and consequently its tendency to neutralize the acid sulphate solution is stronger. Control of the acidity of the solution is therefore an important point. The indium is probably precipitated as the basic indium sulphite as in Procedure B. Addition of the sodium sulphite to the acid sulphate solution generates sulphur dioxide gas which effectively reduces any iron and arsenic present and prevents their precipitation with the indium. After the addition of the sodium sulphite, the solution is heated to about 85° C. When precipitation of the indium has been accomplished, the precipitate is separated from the solution by filtration and is ready for further treatment.

The precipitate obtained by any of the three above-described procedures is treated by a leaching operation with concentrated sodium hydroxide solution, one-half pound of sodium hydroxide being added to each dry pound of precipitate. The sodium hydroxide dissolves a large proportion of the arsenic remaining in the precipitate as well as any alumina that might have been precipitated, but it does not affect the indium. The indium therefore is further concentrated, concentrations of as high as 30% indium having been obtained. The sodium hydroxide leach is allowed to settle and the leach solution is decanted.

The leach residue is given several water washes to insure removal of most of the caustic solution. After the residue from the caustic leach has been washed sufficiently, it is treated with dilute sulphuric acid, sufficient acid being added to dissolve any zinc hydroxide that may have been precipitated by the addition of the sodium hydroxide. Extreme care must be used to insure that at no time will the pulp become even slightly acid, because the indium in the pulp is in a very acid-soluble form, and only a trace of acid will cause a loss of indium. If the neutral point is passed and the pulp becomes acid, this acid must be neutralized, which means that an excess of zinc oxide must be added and any benefit from the indium concentration obtained in the caustic leach, or the elimination of any zinc from the acid wash, would be lost. After the acid wash is completed, the pulp is filtered away from the solution and the filtered pulp is treated further for the recovery of indium.

The indium which has been concentrated in the pulp from the sodium hydroxide leach and sulphuric acid wash is dissolved in commercial sulphuric acid. The acidity of this leach is maintained at from 70 to 100 g./l. H₂SO₄ to insure maximum dissolution of the indium. After the indium has been dissolved, the undissolved solids are filtered away from the solution and treated for lead and other metals not soluble in the acid. The acid sulphate solution containing the indium is treated further for the recovery of the indium.

Up to this point in the process, if all of the necessary precautions have been observed, a minimum portion of any arsenic and iron which was present in the original indium-bearing material will be present in the strong acid sulphate solution. There will also be present in varying amounts such impurities as copper, antimony, germanium, etc., which must be removed before the final recovery of indium. The acidity of the strong acid sulphate solution is therefore adjusted by the addition of more sulphuric acid to bring the acidity up to a point where the arsenic and other metals may be precipitated as sulphides while the indium remains unprecipitated in the solution. An acidity between 120 and 150 g./l. H₂SO₄ is usually sufficient for this precipitation operation. Hydrogen sulphide gas is then passed into the solution to effect precipitation of arsenic and other impurities as sulphides. After the arsenic has been completely removed, as determined by actual test for its presence in the solution, the sulphide precipitate is separated from the arsenic-free indium-bearing solution by filtration.

The arsenic-free acid sulphate solution containing the indium is now treated with metallic zinc for the removal of the indium. The solution should be arsenic-free when the zinc metal is added for otherwise extremely poisonous arsine gas will be formed. The optimum temperature for the replacement of indium by zinc has been determined to be in the range from 30 to 50° C. The acidity of the solution should be high to start with, say from 100 to 150 g./l. $H_2SO_4$, to insure the removal of any zinc oxide on the surface of the zinc metal. The indium in the acid sulphate solution is precipitated as a high-grade indium metal sponge containing about 96% indium. This sponge is separated from the solution by filtration and is washed thoroughly with water to remove any occluded water-soluble zinc, iron, etc., and is then thoroughly dried.

Assuming it is desired to recover metallic indium of high purity from the dried indium sponge, the sponge is now treated with hydrochloric acid to dissolve the indium. The acidity of this leach is maintained at as low a concentration as possible and still secure a high concentration of indium in the solution. Leaching with a solution containing a low concentration of acid and using an excess of indium sponge insures minimum dissolution of the more insoluble impurities that might be present in the sponge.

The acid indium chloride solution from this leach is separated from the undissolved solids by filtration. The acid chloride solution is then treated with a saturated solution of barium chloride to remove any $SO_4$ ions that may be present in the solution. All $SO_4$ ions should be removed, inasmuch as the presence of these ions is injurious if present during the final electrolysis of the indium chloride solution.

The barium sulphate precipitate is removed from the acid chloride solution by filtration and the acidity of the solution is reduced to from 8 to 10 g./l. HCl by the addition of a suitable base such as sodium hydroxide. The solution is then treated with hydrogen sulphide gas to remove any cadmium and copper and a portion of any lead that might still be present. The solution is then separated from the sulphide precipitate.

The acid indium chloride solution still carries small amounts of impurities such as lead, tin, etc., which will deposit with the indium during electrolytic recovery thereof if they are not removed from the solution. No effective way has been found to remove these last traces of impurities except by electrical purification. The acid indium chloride solution is introduced into an electrical purification cell which is fitted with soluble anodes, preferably of indium metal, and cathodes which may be made of graphite or of the same metal as the anode. Direct current is applied to the cell with a current density sufficiently high and at a potential of sufficient value to overcome polarization and force the deposit of impurities, but the current density and potential should not be high enough to dissolve any impurities from the anode or to deplete the solution of indium to any substantial extent. When using indium anodes and cathodes, a practical current density is 2.5 amperes per square foot of anode area and a practical applied potential is 1 to 2 volts. When both anodes and cathodes are made of the same metal such as indium, the polarity of these electrodes may be reversed from time to time during the course of the purification operation so as to secure most effective and repeated use of the purifying metal. The area of the electrodes should be relatively large, and the solution should be agitated during treatment in the cell in such a manner as to insure complete deposition of all impurities in a short period of time. This time generally varies from two to four hours. When the impurities have been removed from the solution, as determined, for example, by spectroscopic tests, the solution is filtered away from the slimes or other solids accumulated during the purification. Inasmuch as these solids contain some indium, they are advantageously retreated for the further recovery of the indium. The filtered acid indium chloride solution is now ready for electrolysis.

Electrolysis of the acid indium chloride solution advantageously is accomplished in a suitable cell equipped with insoluble graphite electrodes. Direct current is applied at a current density of from 1 to 15 amperes per square foot of cathode area. The best deposit is obtained at a current density of approximately four amperes per square foot and a terminal voltage of approximately 2.0 volts.

The cathodes are removed from the cell at suitable intervals and any residual electrolyte is washed with water from the surface of the cathode deposit. The indium metal is stripped from the surface of the cathode and the cathode replaced in the cell for further deposition of indium. The electrolyte may be depleted to as low as 0.02 g./l. indium, but in practice, it is desirable to finish electrolysis when the indium content of the electrolyte has been reduced to from 8 to 10 g./l. indium. The indium thus left in the electrolyte is returned to the process for eventual recovery.

The metallic indium stripped from the cathode is dried, melted and cast into suitable shapes in accordance with usual practice.

The indium metal produced by the above process has a purity of 99.99+% indium. If this high purity of indium is not required, but a purity of say 99.8 to 99.9% indium is sufficient, the above-described steps following the precipitation of the indium sponge may be dispensed with and direct melting of the indium sponge may be substituted, as outlined by the optional procedure shown in dotted lines on the accompanying flowsheet. This is accomplished by first briquetting the indium sponge and then melting it under a cover of a fused strong alkali such as sodium hydroxide. Indium, being a soft and ductile metal, is easily briquetted.

Sodium hydroxide or other suitable caustic is melted in a suitable receptacle such as a cast iron pot and the indium sponge briquettes are added to the molten caustic. The density of indium is greater than that of the sodium hydroxide and the metal therefore drops to the bottom of the receptacle. The cover of caustic prevents oxidation of the metal and also dissolves some of the zinc and lead in the sponge. When the indium sponge is melted, the molten metal is poured out and cast into suitable shapes. The caustic, which will contain some indium, is returned to the process for recovery of the indium.

Although the invention has been described above with particular reference to a complete process for the recovery of indium from an indium-bearing material containing zinc in substantial quantities together with substantial amounts of impurities such as iron and arsenic, it is understood that the process may be applied also to other indium-bearing materials. It is also understood that the various novel steps of the complete process each are individually applicable to the treatment of appropriate indium-bearing residues or solutions without departure from the scope of the invention.

We claim:

1. In the method of recovering indium from indium-bearing material containing zinc in acid-soluble form and further containing impurities including iron, aluminum and arsenic wherein the material is leached with a very dilute acid solution in such manner that the bulk of the zinc is dissolved and the indium remains in the undissolved residue and the indium-bearing residue is separated from the leach solution and dissolved in relatively strong acid to obtain an acid solution containing indium, the improvement which comprises treating the resulting indium-bearing solution to form an insoluble precipitate containing indium free from the bulk of the iron and arsenic originally present, treating the indium-bearing precipitate thus obtained with a solution of a strong alkali to dissolve aluminum and a further amount of arsenic therefrom, further treating the precipitate with dilute sulphuric acid in such manner as to dissolve zinc therefrom without acidifying and dissolving indium from the precipitate, separating the thus-treated indium-bearing precipitate from the solution, dissolving the separated precipitate in a relatively strong acid solution, treating the acid solution with a sulphide to precipitate substantially all remaining arsenic therefrom, separating the resulting sulphide precipitate from the solution, treating the arsenic-free solution with metallic zinc, whereby metallic sponge indium is precipitated, and recovering metallic indium from the precipitated sponge.

2. In the method of recovering indium from indium-bearing material containing zinc in acid-soluble form and further containing impurities including iron and arsenic wherein the material is leached with a very dilute acid solution in such manner that the bulk of the zinc is dissolved and the indium remains in the undissolved residue and the indium-bearing residue is separated from the leach solution and dissolved in relatively strong acid to obtain an acid solution containing indium, the improvement which comprises treating the resulting indium-bearing solution to form an insoluble precipitate containing indium free from the bulk of the iron and arsenic originally present, subsequently dissolving the indium-bearing precipitate in a relatively strong acid solution, treating the resulting solution with a sulphide in such manner as to effect substantially complete precipitation of residual arsenic therefrom, separating the precipitate from the indium-bearing solution, treating the substantially arsenic-free indium-bearing solution with metallic zinc, whereby metallic sponge indium is precipitated, and recovering metallic indium from precipitated sponge.

3. In a method for the recovery of indium from indium-bearing material containing zinc, arsenic and iron in acid-soluble form, the steps which comprise leaching said material with a dilute sulfuric acid solution having an acidity corresponding to about 1 to 3 g./l. $H_2SO_4$ in such manner that the bulk of the zinc and considerable amounts of arsenic and iron are dissolved and the indium remains in the undissolved residue, separating the indium-bearing residue from the zinc-bearing solution, and dissolving the indium-bearing residue in a relatively strong acid to obtain an acid, relatively concentrated indium-bearing solution.

4. In a method for the recovery of indium from indium-bearing material containing zinc in acid-soluble form, the steps which comprise leaching said material with a dilute sulphuric acid solution having an acidity corresponding to about 1 to 3 g./l. $H_2SO_4$ in such manner that the bulk of the zinc is dissolved and the indium remains in the undissolved residue, separating the indium-bearing residue from the zinc-bearing solution and dissolving the indium-bearing residue in a relatively strong sulphuric acid solution having an acidity corresponding to about 20 to 25 g./l. $H_2SO_4$.

5. In a method for the recovery of indium from an indium-bearing material containing zinc, arsenic and iron in acid-soluble form, the step which comprises leaching said material with a dilute sulphuric acid solution having an acidity corresponding to about 1 to 3 g./l. $H_2SO_4$ in such manner that the bulk of the zinc and considerable amounts of arsenic and iron are dissolved and the indium remains in the undissolved residue.

6. In a method for the recovery of indium involving treatment of a sulphuric acid indium-bearing solution containing impurities including iron and arsenic, the steps which comprise treating the solution with sodium sulphite in sufficient amount to reduce the acidity of the solution to a value corresponding to about 1 to 3 g./l. $H_2SO_4$, and treating the resulting solution with zinc oxide in sufficient amount to render the solution substantially neutral but not basic, whereby the indium is precipitated from the solution as an insoluble compound substantially free from the bulk of the iron and arsenic originally present, and separating the indium-bearing precipitate from the residual solution.

7. In a method for recovering indium involving treatment of an acid-soluble indium-bearing material containing a relatively high concentration of indium associated with impurities including arsenic, the steps which comprise dissolving said material in a relatively strong acid to produce an indium-bearing solution containing arsenic and having an acidity corresponding to about 120 to 150 g./l. $H_2SO_4$, treating the acid solution thus obtained with a sulphide in such manner as to effect substantially complete precipitation of the arsenic, separating the sulphide precipitate from the indium-bearing solution, and treating the indium-bearing solution with metallic zinc, whereby metallic sponge indium is precipitated from the solution.

HOMER M. DORAN.
MERYL A. JACKSON.
ALFRED I. ALF.